(12) United States Patent
Kloos

(10) Patent No.: US 9,297,432 B2
(45) Date of Patent: Mar. 29, 2016

(54) BRAKE DISC FOR A LAND VEHICLE, AND LAND VEHICLE, IN PARTICULAR WITH A BRAKE DISC OF THIS TYPE

(75) Inventor: Eugen Kloos, Bensheim (DE)

(73) Assignee: WABCO RADBREMSEN GMBH, Mannheim (DE)

( * ) Notice: Subject to any disclaimer, the term of this patent is extended or adjusted under 35 U.S.C. 154(b) by 69 days.

(21) Appl. No.: 14/009,019

(22) PCT Filed: Mar. 23, 2012

(86) PCT No.: PCT/EP2012/001292
§ 371 (c)(1),
(2), (4) Date: Nov. 4, 2013

(87) PCT Pub. No.: WO2012/136316
PCT Pub. Date: Oct. 11, 2012

(65) Prior Publication Data
US 2014/0048361 A1   Feb. 20, 2014

(30) Foreign Application Priority Data

Apr. 4, 2011 (DE) .......................... 10 2011 016 029

(51) Int. Cl.
*F16D 65/12* (2006.01)
*F16D 65/02* (2006.01)

(52) U.S. Cl.
CPC .............. *F16D 65/12* (2013.01); *F16D 65/123* (2013.01); *F16D 2065/1308* (2013.01); *F16D 2065/1328* (2013.01); *F16D 2065/1384* (2013.01); *F16D 2200/0013* (2013.01)

(58) Field of Classification Search
CPC .......... F16D 65/123; F16D 2065/1308; F16D 2065/1372; F16D 2065/1384
See application file for complete search history.

(56) References Cited

U.S. PATENT DOCUMENTS

| | | | |
|---|---|---|---|
| 5,918,707 A * | 7/1999 | Saunders, III | 188/18 A |
| 7,044,563 B2 * | 5/2006 | Suzuki | 301/105.1 |
| 7,540,569 B2 * | 6/2009 | Morimoto et al. | 301/105.1 |
| 2005/0099058 A1 | 5/2005 | Suzuki | |
| 2006/0086578 A1 * | 4/2006 | Weiss | 188/218 XL |
| 2006/0243546 A1 * | 11/2006 | Oberti et al. | 188/218 XL |
| 2009/0218878 A1 * | 9/2009 | Lippis | 301/6.8 |

FOREIGN PATENT DOCUMENTS

DE    2828109 A *  1/1980
EP    1903247 A3   4/2009
(Continued)

OTHER PUBLICATIONS

International Search Report mailed Jun. 27, 2012 for International Application No. PCT/EP2012/001292, 2 pages.
(Continued)

*Primary Examiner* — Anna Momper
(74) *Attorney, Agent, or Firm* — Schwabe, Williamson & Wyatt, P.C

(57) ABSTRACT

The invention relates to a brake disc for a land vehicle, particularly a commercial vehicle, having an axis of rotation, a friction ring, a disc pot and a disc flange for flange-mounting the same to the wheel hub of a vehicle, wherein the disc flange includes a flange facing.

According to the invention, it is provided that the flange facing encloses an acute angle with a normal of the axis of rotation in the longitudinal sectional plane that contains the axis of rotation, when the flange facing is in the non-flange-mounted state thereof.

14 Claims, 4 Drawing Sheets

(56) References Cited

FOREIGN PATENT DOCUMENTS

| WO | WO 9832639 A1 * | 7/1998 |
| WO | WO 02/087901 A1 | 11/2002 |
| WO | WO 2004/102029 A1 | 11/2004 |

OTHER PUBLICATIONS

International Preliminary Report on Patentability for International Application No. PCT/EP2012/001292, 7 pages.

* cited by examiner

BRAKE DISC FOR A LAND VEHICLE, AND LAND VEHICLE, IN PARTICULAR WITH A BRAKE DISC OF THIS TYPE

CROSS REFERENCE TO RELATED APPLICATION

The present application is a 35 U.S.C. §371 national phase entry application of, and claims priority to, International Patent Application No. PCT/EP2012/001292, filed Mar. 23, 2012, which claims priority to German Patent Application No. DE 102011016029.9, filed Apr. 4, 2011, the disclosures of which are hereby incorporated by reference in their entirety for all purposes.

TECHNICAL FIELDS

The invention relates to a brake disc for a land vehicle, particularly a commercial vehicle, having an axis of rotation, a friction ring, a disc pot and a disc flange for creating a flange-mounted connection to a wheel hub of the vehicle, wherein the disc flange includes a flange facing.

BACKGROUND

Brake discs of the aforementioned kind are known in the art. The friction ring therein includes rubbing surfaces on both sides. Following the friction ring, there extends, axially along the axis of rotation, a disc pot, and the disc flange extends in the radial direction from here.

The friction ring, the disc pot and the disc flange can be configured in pairs or, all three of them, in one piece with each other. They are manufactured, for example, as cast parts from soft gray cast iron or cast iron, respectively.

The disc flange therein includes, for example, a plurality of (threaded) bores that are distributed over the circumference thereof. Typically, they extend in the axial direction. The (threaded) bores serve for flange-mounting the disc flange to the wheel hub of the vehicle; typically, this is done by means of screws that are screwed into the threaded bores, for example.

Customarily, the flange facing of the disc flange as well as the flange facing of the wheel hub have a planar configuration, wherein both of the mentioned flange facings extend perpendicularly in relation to the axis of rotation.

When flange-mounting the brake disc to the wheel flange, a frictional closure is achieved between the two flange facings by the aforementioned axially disposed screwed connection, such that any moments occurring during the braking operation are essentially transferred to the wheel hub via the frictional closure in the contact zones.

To provide an adequate configuration of this frictional closure, particularly in cases when the brake disc are used on commercial vehicles, high tightening moments are applied corresponding to the size of the disc and the dimensions of the screws. Nevertheless, the eventuality that the frictional closure is insufficient, cannot always be precluded. If this is the case, due to the play between the interior wall of the bores that accommodate the screws, relative movements between the disc and the wheel hub occur, such as, for example, when high braking moments are in effect on the brake disc when changing from forward to reverse travel, such that the frictional closure is being neutralized.

Extreme compressive strains are generated, due to the high requirements that are demanded of the brake disc, particularly in the transitional area between the disc flange and the disc pot, meaning approximately in the radially interior area of the disc flange. If fastening is achieved with screws that extend inside bores, this critical area is usually radially inside with regard to the bore. As a consequence, increased wear and tear in form of partial and/or complete tears occurs primarily in the area of the internal radius of the flange facing of the disc flange.

Due to the limited available structural space, a reinforcement of the brake disc in the mentioned critical area, for example by an increased material use, is not possible. Moreover, such increased material use would also result in a corresponding weight increase.

Therefore, it is the object of the present invention to improve a bake disc of the kind as referred to in the introduction that also accommodates higher stress requirements associated with high braking moments while, simultaneously, only taking up a minimal amount of construction space and having only a minimal weight.

SUMMARY

According to the invention, the formulated object is achieved in that the flange facing, when it is not in the flange-mounted state, encloses in a longitudinal section plane, which contains the axis of rotation, an acute angle with a normal to the axis of rotation.

In other words, the radially exterior area of the flange facing axially protrudes relative to the radially interior area of the flange facing area. This means that, when the brake disc is flange-mounted to the wheel hub, the radially exterior area of the disc flange is braced to a higher degree than the radially interior area. Consequently, the compressive strains that occur due to the flange-mounting step are shifted from the aforementioned critical and radially interior area of the disc flange to the radially exterior area, such that the tearing risk is drastically reduced.

In other words, in the state when flange-mounted to the wheel hub but not yet braced, the flange facing according of the invention forms a wedge-like gap or intermediate space radially that opens to the interior in a longitudinal section plane that contains the axis of rotation. When this gap or intermediate space, respectively, is closed, for example by bracing with the corresponding axial screws, the thus resulting strain and compression occur almost exclusively in the radially exterior area, while the critical radially interior area is relieved.

Aside from relieving the critical area from compressive strains, the invention also enlarges the effective radius for the transfer of the brake moment that is achieved by the frictional closure, thus preventing any relative movement of the brake disc relative to the wheel flange.

According to the invention, preferably, the aforementioned acute angle is greater than 0.2°. Advantageously, it is in the range of 0.2° to 3.5°, preferably 0.5° to 1.5°, and further preferred 0.8° to 1.2°.

According to the invention, it is further preferred that a radially interior area of the flange facing in a longitudinal section plane is in closer proximity to the plane where a frictional surface of the brake disc is disposed than a radially exterior area of the flange facing.

With this configuration, the aforementioned displacement of the compressive strains to the radially exterior area of the disc flange is achieved.

According to the invention, the disc flange, preferably, further includes, seen in a top view along the axis of rotation, at least one neck that extends radially to the exterior and supports the flange facing.

In other words, according to this configuration, the disc flange according to the invention is not enlarged over the entire circumference thereof but only locally-radially in order to absorb the aforementioned compressive strains in this radially enlarged area. Advantageously, in such a case, the bracing means, for example a screw, which extends through a corresponding passage opening in the flange, is disposed in the area of the neck in order to brace the neck.

However, the invention is not limited to a single neck. Rather, according to the invention, it is provided that the disc flange has, seen in the top view, a meandering-like external contour along the axis of rotation with a plurality of necks and depressions between two necks, respectively, and wherein the necks each have an opening for receiving a fastening means intended for the fastening step on the wheel hub.

Correspondingly, this configuration uses a plurality of fastening means, for example screws that extend through the respective passage openings, with the disc flange being enlarged in the radial direction in all places where such fastening means are located in order to create a separate area for absorbing the compressive strains generated by the fastening means.

According to the invention, the disc flange, the disc pot and the friction ring can be principally configured and combined with each other in any which way. According to the invention, it is preferred, however, to configure the disc flange in one piece with the disc pot and/or the disc pot in one piece with the fraction ring.

The invention is particularly expedient for use in connection with brake discs on commercial vehicles, meaning disc that have a comparatively large diameter. Therefore, according to the invention, it is preferred for the disc diameter to be between 375 mm and 525 mm, more preferred 376 mm, 430 mm, 432 mm, 433 mm or 525 mm.

According to the invention, it is further preferred for the brake disc to be internally ventilated.

Aside from the brake disc that is described above, the invention also provides a land vehicle, particularly a commercial vehicle, having a wheel hub with a first flange facing, a bake disc with an axis of rotation and a second flange facing that rests, when the brake disc is flange-mounted to the wheel hub, against the first flange facing, and a means for bracing the brake disc with the wheel hub in the flange-mounted state. To provide a solution to the aforementioned task according to the invention, it is provided therein that the two flange facings, when they are in the flange-mounted but non-braced state, delimit a wedge-like intermediate space between them that opens radially to the interior in a longitudinal sectional plane containing the axis of rotation, and that rest against each other in a planar fashion in the braced state.

According to the invention, the land vehicle is preferably equipped with a brake disk as discussed in detail above.

BRIEF DESCRIPTION OF THE DRAWINGS

The invention will be described below in further detail based on a preferred embodiment in reference to the enclosed drawing. Shown are as follows.

DETAILED DESCRIPTION OF THE EMBODIMENTS

Figure 1:
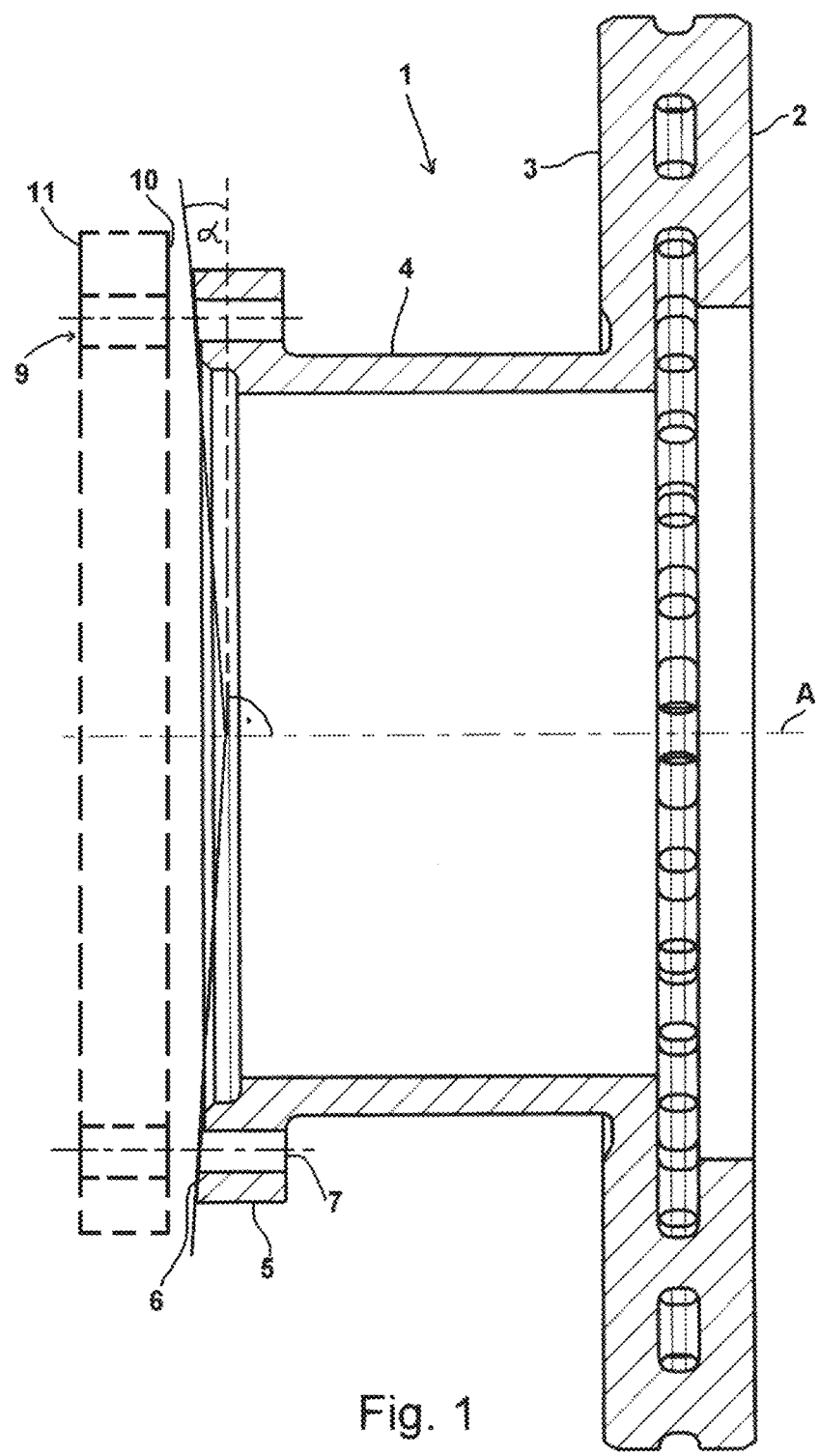
FIG. 1 is a longitudinal section of the brake disk according to an embodiment of the invention with a wheel hub indicated by the perforated line.
Figure 2:
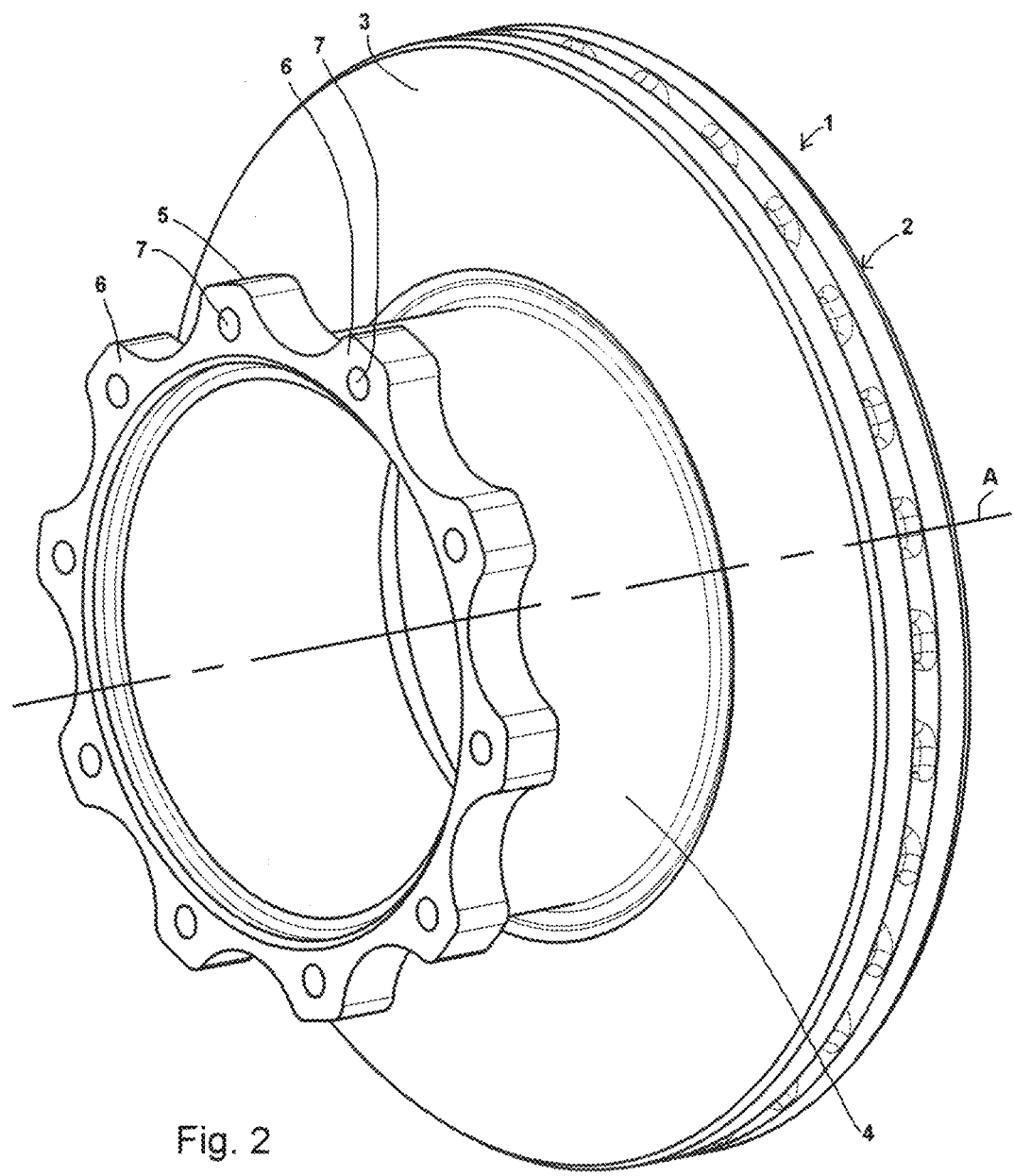
FIG. 2 is a perspective view of a representation of the brake disc according to FIG. 1.

The brake disc as a whole as shown in the drawing is designated by the reference number 1. It includes two friction rings that are connected to each other, for example via bars, pimples, ribs and the like, thereby forming a cooling channel, and the rubbing surfaces 2, 3 against which the brake linings of a disc brake, presently not shown, are pressed during a braking action. The axis of rotation of the brake disc 1 is designated by the letter A.

The disc brake 1 includes a disc pot 4 that is presently configured in one piece with the friction ring with the rubbing surface 3, for example.

Figure 3:
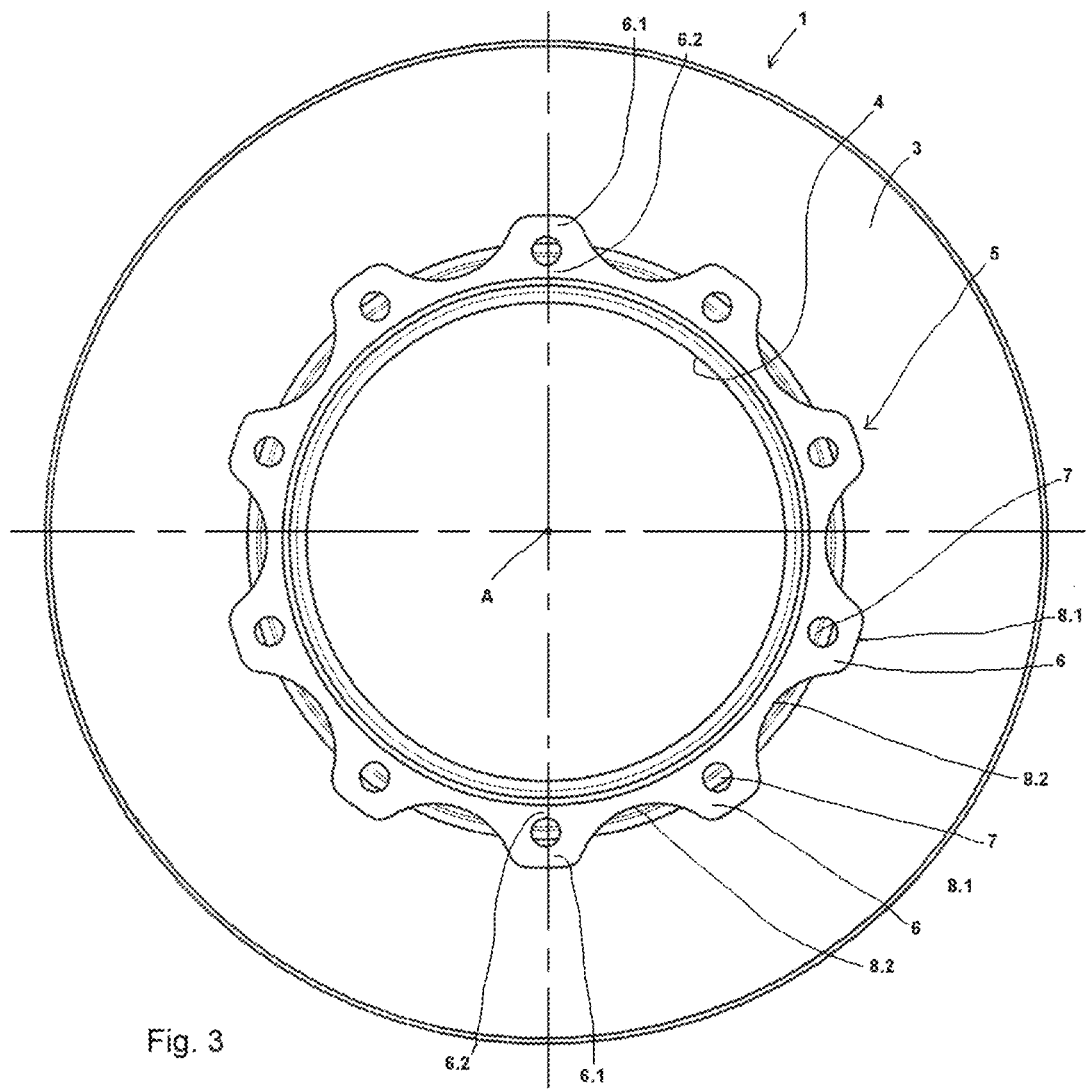
FIG. 3 is a top view of the brake disc according to FIG. 1.

The disc pot 4 includes on one of the ends thereof a disc flange 5 with a flange facing 6, which extends radially to the exterior and is configured in one piece with the former. According to the view as shown in FIG. 3, the disc flange 5 has a meandering-like outer contour, resulting in wave mounts or necks 8.1 and wave valleys or depressions 8.2, respectively. The wave mounts or necks 8.1 include each at least one passage bore 7.

The size, shape and radii of curvature of the wave mounts or necks 8.1 and/or the wave valleys or depressions 8.2 can be symmetrical or non-symmetrical, because the configuration and/or dimensioning depends on the size of the brake discs and the forecast strains. This means they depend of the planned application. A plurality of contact zones is formed by the meandering shape that constitute together the flange facing 6 of the disc flange 5. The flange facing 6 describes an envelope of cone because, in the depicted embodiment, it encloses an angle $\alpha$ with the normal on the axis of rotation A, which is 1.0° in the shown embodiment.

The disc flange 5 with the flange facing 6 that is arranged at the angle $\alpha$ is disposed, as shown in the representation in FIG. 1, opposite a wheel hub 11, shown as a perforated line, by a flat flange facing 10 that is disposed perpendicularly relative to the axis of rotation A. The wheel hub 11 therein includes a hole pattern that corresponds to the hole pattern of the disc flange 5, allowing to create a screwed connection 9, whereby it is possible to achieve a flange-mounted connection with a force closure. The type of the screwed connection and/or how it is the implemented is decided case by case. In the embodiment that is shown in the drawing, the screws are passed through the corresponding openings in the wheel hub 11, they are screwed in the passage openings 7, which are configured as threaded bores. Although the shape/configuration of the wheel hub can depend on a case by case basis, however, it always include a flange facing 10. It is noted in this context that, depending of the application, this flange facing 10 does not necessarily extend perpendicularly relative to the axis of rotation A; it can also represent a counter-area that extends approximately at the angle $\alpha$ provided the angle difference for the configuration of a, seen in a longitudinal section, wedge-like intermediate space is maintained. In fact, with the corresponding selection of the angle $\alpha$, the effect according to the invention is here achieved as well.

If the flanks of the flanges 6 and 10 according to FIG. 1 are disposed opposite each other in the unscrewed state, there results an angular gap between the two mentioned surfaces that corresponds to the placement angle $\alpha$. The size of the angle $\alpha$ also depends on the respective application of the brake disc, the size thereof and the materials thereof, which is why the angle of ca. 1.0°, as shown in the drawing, must be understood only as one option among many. The wedge-like gap between the two flange facings 10 and 6 opens radially to the interior.

When the brake disc 1 is screwed to the wheel hub 11, the gap between the two flange facings 10 and 6 closes, due to the deformation of the disc flange 5 that is associated with this step. The compressive strain thereby generated occurs essentially in the radially exterior area 6.1 of the flange facing 6, while, on the other hand, the radially interior area 6.2 is essentially strain-free. This way, the disadvantageously occurring critical compressive strains that usually occur in the direction toward the disc pot 4 are minimized, or eliminated altogether.

Figure 4:
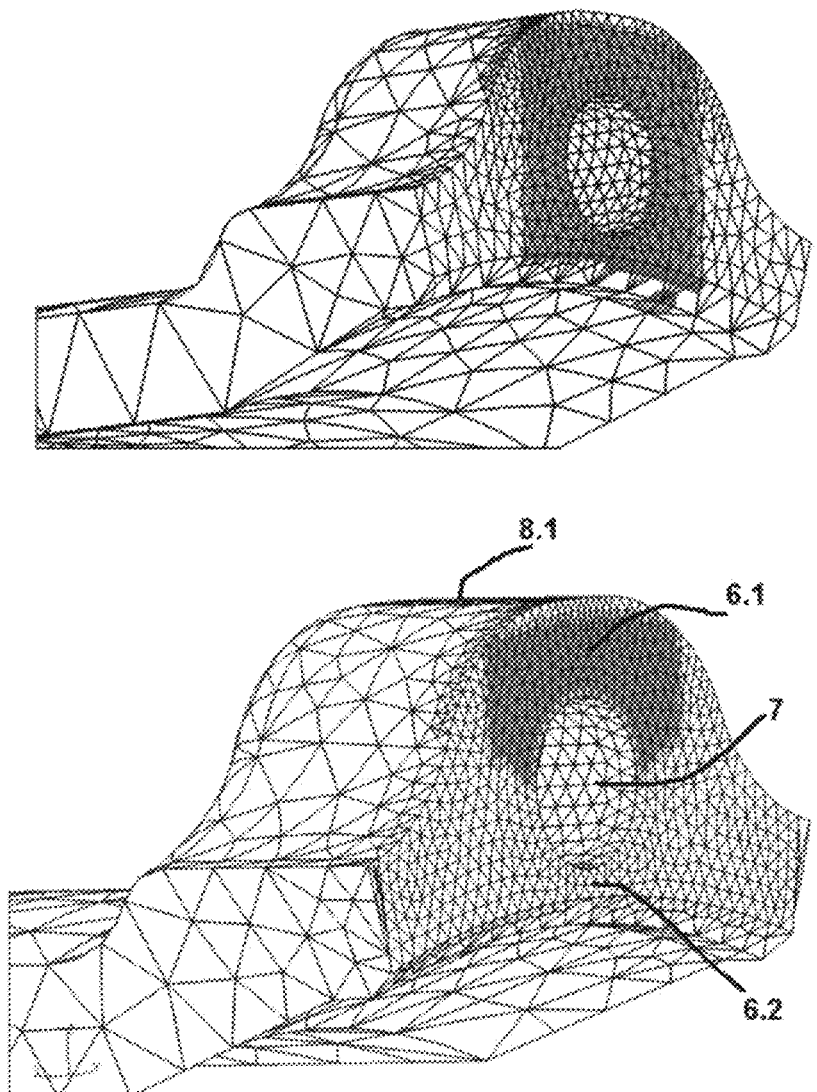
FIG. 4 is a schematic view of a representation of a part of conventional brake disc and of the corresponding part of a brake disc according to the invention by way of a comparison with regard to the strains that are in effect with regard to flange-mounting.

In this context, reference is being made to the comparative representation that is seen in FIG. 4, where the compressive strains that are marked therein on the conventional brake disc (top image) are distributed more or less evenly over the flange facing 6, while, on the other hand, in the configuration of the brake disc according to the invention (bottom image), they are concentrated in the radially exterior area 6.1. The radially exterior area 6.1 is constituted therein of wave mounts or necks 8.1, respectively, that are have the task, in particular, of absorbing the aforementioned compressive strains such as to protect the mentioned critical area against them.

The brake disc as described above is made in one piece. The solution according to the invention, however, can also be used for brake discs without internal ventilation, that are configured rather in the manner of a solid disc. The property of being made in one piece can be achieved by composite casting, when the goal is to connect the brake disc pot to the friction ring. In the same way, screwed connections and/or other form-closure connections can be used here as well, because all brake disc apparatuses share the property that they are fastened by means of the radial flange facing to a wheel hub. The radial flange facing can also extend radially-interior, because the placement of the flange facing can be implemented here too. In this case, however, the respective neck extends radially-interior (as a continuous flange or as wave mount), and the radially-interior facing serves for absorbing the occurring compressive strains.

The characterizing features that are disclosed in the above description as well as the claims and in the drawing can have essential significance for the embodiment of the invention either individually or in any combination.

The invention claimed is:

1. A brake disc for a commercial land vehicle, having an axis of rotation and a radial axis perpendicular to the axis of rotation,
a friction ring,
a disc pot coupled to the friction ring, and
a disc flange coupled to the disc pot opposite the friction ring with the disc flange, wherein the disc flange includes a flange facing disposed around a periphery of the disc flange, wherein the flange facing forms a bracing flange-mounted connection to a wheel hub of the vehicle, in which the flange facing abuts the wheel hub, wherein a plane of the flange facing forms a substantially zero angle with the radial axis, in response to an abutment of the flange facing and the wheel hub and corresponding deformation of the disc flange in the bracing flange-mounted connection to the wheel hub, wherein the plane of flange facing forms an acute angle ($\alpha$) with the radial axis before the bracing flange-mounted connection to the wheel hub is formed.

2. The brake disc according to claim 1, characterized in that the angle ($\alpha$) is greater than 0.2°.

3. The brake disc according to claim 1, characterized in that the angle ($\alpha$) is in the range of 0.2° to 3.5.

4. The brake disc according to claim 3, characterized in that the angle ($\alpha$) is in the range of 0.5° to 1.5°.

5. The brake disc according to claim 3, characterized in that the angle ($\alpha$) is in the range of 0.8° to 1.2°.

6. The brake disc according to claim 1, characterized in that, within a longitudinal section plane, a radially interior area of the flange facing is in closer proximity to that plane in which a frictional area of the brake disc is disposed than a radially exterior area of the flange facing.

7. The brake disc according to claim 1, characterized in that the disc flange, seen in a top view along the axis of rotation, includes at least one neck that extends radially-exterior and supports flange facing.

8. The brake disc according to claim 1, characterized in that the disc flange, seen in a top view along the axis of rotation, includes a meandering external contour with a plurality of necks and depressions, respectively disposed between two necks, wherein each neck has an opening for receiving a fastening means for the fastening connection with the wheel hub.

9. The brake disc according to claim 1, characterized in that the disc flange is configured in one piece with the disc pot, and/or in that the disc pot is configured in one piece with the friction ring.

10. The brake disc according to claim 1, characterized in that the disc diameter is in the range of 375 mm to 525 mm.

11. The brake disc according to claim 10, characterized in that the disc diameter is selected from one of: 375 mm, 430 mm, 432 mm, 433 mm or 525 mm.

12. The brake disc according to claim 1, characterized in that the brake disc is internally ventilated.

13. A commercial land vehicle with the brake disc according to any of claims 1 to 12.

14. A commercial land vehicle having
a wheel hub with a first flange facing,
a brake disc with an axis of rotation and a radial axis perpendicular to the axis of rotation, a friction ring, a disc pot coupled to the friction ring, and a disc flange coupled to the disc pot opposite the friction ring, wherein the disc flange includes a second flange facing disposed around a periphery of the disc flange, wherein the flange facing forms a bracing flange-mounted connection to a wheel hub of the vehicle, in which the flange facing abuts the wheel hub, wherein a plane of the flange facing forms a substantially zero angle with the radial axis, in response to an abutment of the flange facing and the wheel hub and corresponding deformation of the disc flange in the bracing flange-mounted connection to the wheel hub, wherein the plane of flange facing forms an acute angle ($\alpha$) with the radial axis before the bracing flange-mounted connection to the wheel hub is formed.

* * * * *